United States Patent [19]

Mieville

[11] 3,907,792

[45] Sept. 23, 1975

[54] PHENOXY-ALKYL-CARBOXYLIC ACID DERIVATIVES AND THE PREPARATION THEREOF

[76] Inventor: Andre Mieville, Chemin de Pierre-Fleur 7, 1000 Lausanne, Switzerland

[22] Filed: Jan. 24, 1973

[21] Appl. No.: 326,188

Related U.S. Application Data

[63] Continuation-in-part of Ser. No. 8,071, Feb. 2, 1970.

[30] Foreign Application Priority Data

Jan. 31, 1969 Switzerland.......................... 1517/69
Aug. 28, 1969 Switzerland...................... 13022/69

[52] U.S. Cl. 260/247.2 B; 260/239 BF; 260/243 B; 260/247.2 A; 260/247.7 S; 260/293.73; 260/293.78; 260/268 R; 260/293.8; 260/326.43; 260/470; 260/471 R; 260/473 G; 260/473 S; 260/476 R; 260/515 H; 260/516; 260/517; 260/519; 260/521 R; 260/559 T; 260/559 B; 260/558 A; 260/592; 424/246; 424/248; 424/263

[51] Int. Cl.² ........................................ C07D 295/04

[58] Field of Search .. 260/247.2 A, 247.7 S, 268 H, 260/293.76, 576, 473 G, 293.78, 247.75, 558 A, 239 BF Primary Examiner—Anton H. Sutto
Assistant Examiner—Paul J. Killos
Attorney, Agent, or Firm—Robert E. Burns; Emmanuel J. Lobato; Bruce L. Adams

[57] ABSTRACT

This invention concerns phenoxy-alkyl carboxylic compounds of the formula

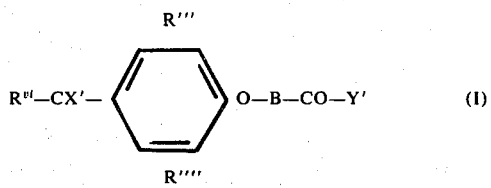

wherein
— B is selected from the group consisting of $CR''R^v$ and $CHR'$—A in which $R'$ is H or $C_6H_5$, A is a $C_1$-$C_3$ alkyl group or a single bond when $R'$ is $C_6H_5$, $R''$ and $R^v$ which may be identical or different represent H, $CH_3$, $C_2H_5$ p—F—$C_6H_4$
— $R'''$ and $R''''$, which may be identical or different, represent H, a halogen atom, preferably F Cl or Br, a $C_{1-5}$ alkyl group, $CF_3$, $SCH_3$ $SOCH_3$, $SO_2CH_3$, $OCH_3$, OH, $C_6H_5$ or a substituted phenyl group.
— $R^{vi}$ represents H, a $C_{1-5}$ alkyl group, an aryl group, an aryl group the aromatic moiety of which is substituted by one or more $CH_3$, $CF_3$ or halogen atoms, a cycloalkyl group, OH, a $C_{1-6}$ alkoxy group, an aryloxy group, an aryloxy group the aromatic moiety of which is substituted, a cycloalkyloxy group, a $NR_3R_4$ group, a $NHCH_2$—$CH_2NR_3R_4$ group or a O—alkylene—$NR_3R_4$ group.
— Y' represents OH, lower alkoxy having preferably from 1 to 4 carbon atoms, $NR_3R_4$, $NHCH_2CH_2NR_3R_4$ or O—alkylene—$NR_3R_4$;
— X' represents O or $NOR_o$;
— $R_o$ represents H, lower alkyl having preferably from 1 to 5 carbon atoms, $CH_2CH_2NR_3R_4$ or $CH_2CHOHCH_2OH$;
— $R_3$ and $R_4$, which may be identical or different, represent H, lower alkyl having from 1 to 5 carbon atoms, a $C_{3-7}$ cycloalkyl group preferably a $C_{5-6}$ cycloalkyl group, an aryl group, an aryl group the aromatic moiety of which is substituted by one or more halogen atoms or $CF_3$ or $CH_3$, $R_3$ and $R_4$ considered together being able to form with the nitrogen atom to which they are bonded a group selected from group consisting of
 a. 5- to 7- membered heterocyclic ring which may contain a second heteroatom selected from O, S and N and which may be substituted, and
 b. an amide radical issuing from lysine or cysteine.

7 Claims, No Drawings

PHENOXY-ALKYL-CARBOXYLIC ACID DERIVATIVES AND THE PREPARATION THEREOF

This is a continuation-in-part of my copending U.S. Application Ser. No. 8071, filed Feb. 2, 1970. This invention which is a continuation in part of my copending U.S. Pat. Application Ser. No. 8071 filed on Feb. 2, 1970 is concerned with phenoxy-alkyl-carboxylic compounds useful in therapeutic. This invention concerns phenoxy-alkyl carboxylic compounds of the formula

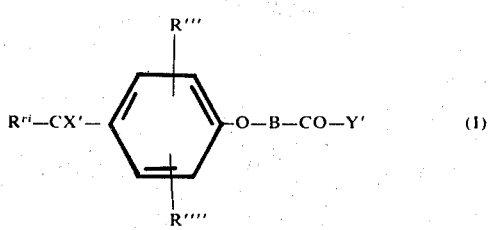

wherein
— B is selected from the group consisting of $CR''R^r$ and $CHR'$—A in which $R'$ is H or $C_6H_5$, A is a $C_1$ - $C_3$ alkyl group or a single bond when $R'$ is $C_6H_5R''$ and $R^r$ which may be identical or different represent H, $CH_3$, $C_2H_5$, $C_6H_5$ p—F—$C_6H_4$;
— $R'''$ and $R''''$, which may be identical or different, represent H, a halogen atom, preferably F, Cl or Br, a $C_{1-5}$ alkyl group, $CF_3$, $SCH_3$, $SOCH_3$, $SO_2CH_3$, $OCH_3$, OH, $C_6H_5$ or a substituted phenyl group. — $R^{ri}$ represents H, a $C_{1-5}$ alkyl group, an aryl group, an aryl group the aromatic moiety of which is substituted by one or more $CH_3$, $CF_3$ or halogen atoms, a cycloalkyl group, OH, a $C_{1-6}$ alkoxy group, an aryloxy group, an aryloxy group the aromatic moiety of which is substituted, a cycloalkyloxy group, a $NR_3R_4$ group; a $NHCH_2$—$CH_2NR_3R_4$ group or a O—alkylene—$NR_3R_4$ group.
— $Y'$ represents OH, lower alkoxy having preferably from 1 to 4 carbon atoms, $NR_3R_4$, $NHCH_2CH_2NR_3R_4$ or O—alkylene—$NR_3R_4$;
— $X'$ represents O or $NOR_o$;
— $R_o$ represents H, lower alkyl having preferably from 1 to 5 carbon atoms, $CH_2CH_2NR_3R_4$ or $CH_2CHOHCH_2OH$;
— $R_3$ and $R_4$, which may be identical or different, represent H, lower alkyl having from 1 to 5 carbon atoms, a $C_{3-7}$ cycloalkyl group preferably a $C_{5-6}$ cycloalkyl group, an aryl group, an aryl group the aromatic moiety of which is sustituted by one or more halogen atoms or $CF_3$ or $CH_3$, $R_3$ and $R_4$ considered together being able to form with the nitrogen atom to which they are bonded a group selected from group consisting of
a. 5- to 7- membered heterocyclic ring which may contain a second heteroatom selected from O, S and N and which may be substituted, and
b. an amide radical issuing from lysine or cysteine.

This invention also concerns the acid addition salts which can be formed from formula I compounds.

Compounds corresponding to formula I can be used as therapeutic agents. They act in particular on the central nervous system, or as anti-inflammatory or normolipemiant agents and can be used in therapeutic medicines as analgesic, anti-inflammatory, pyschotropic, cardiovascular, normolipemiant, hypocholesterolemiant or antitussive ingredients.

Consequently, the invention further provides a therapeutic composition containing at least one compound of the invention, as an active ingredient in association with a pharmaceutically acceptable carrier, diluent or coating.

The term alkyl here means a straight branched hydrocarbon chain. The term alkoxy means a straight or branched hydrocarbon chain which is bonded to an oxygen atom by a single bond Among the alkoxy groups according to this invention, the following simplest ones can be mentioned: methoxy, ethoxy, propyloxy, isopropyloxy, butyloxy, isobutyloxy, tertiobutyloxy.

The preferred cycloalkyl groups are cyclopentyl, cyclohexyl and $\Delta$ 1,2 cyclohexenyl. The preferred cycloalkyloxy groups are cyclopentyloxy, cyclohexyloxy and $\Delta 1,2$ cyclohexenyloxy.

The term "O—alkylene—$NR_3R_4$" which is also described as "aminoalkyloxy", represents a group consisting of a divalent straight or branched hydrocarbon chain which is between an oxygen atom and a $NR_3R_4$ groups. Preferably the alkylene moiety comprises from 1 to 6 carbon atoms. Among the preferred O-alkylene-$NR_3R_4$ groups the following ones can be mentioned: Aminoethoxy, aminopropyloxy, aminoisopropyloxy, mono- and dialkylaminoethoxy, mono- and dialkylaminopropyloxy, mono- and dialkylaminoisopropyloxy, piperidinoethoxy, azepinoethoxy, morpholinoethoxy, piperazinoethoxy, N'-methylpiperazinoethoxy, pyrrolidinoethoxy, piperidinopropyloxy, piperidinoisopropyloxy, azepinopropyloxy, azepinoisopropyloxy, piperazinopropyloxy, piperazinoisopropyloxy, morpholinopropyloxy, morpholinoisopropyloxy, thiomorpholinopropyloxy, thiomorpholinoisopropyloxy, N'-p-chlorophenylpiperazinopropyloxy and N'-p- chlorophenylpiperazinoisopropyloxy.

Examples of groups represented by $NR_3R_4$ are amino, mono- and dialkylamino, morpholino, thiomorpholino, pyrrolidino, piperidino, azepino, N-p-chlorophenylpiperazino, N-methylpiperazino, piperazino, 4-methyl-piperidino, anilino, N-methylanilino, 2,3-dimethyl-anilino, p-chloroanilino, o-trifluoromethylanilino, p-trifluoromethyl-anilino, cyclohexylamino and cyclopentylamino groups and analogs thereof.

The preferred halogen atoms are fluorine, chlorine and bromine.

The aryl group of $R''''$, $R^{r'}$, $R_3$ and $R_4$ can be substituted by one or more F, Cl, Br, $CF_3$ and $CH_3$. The preferred ones according to this invention are phenyl, p-chlorophenyl and p-fluorophenyl.

Between the compounds corresponding to formula I two kinds of products can be distinguished:
1. the p-carbonyl-phenoxy-alkyl-carboxylic acids and derivatives thereof which result:
   a. from transforming the p-oxo group into oxime $\chi'= NOR_o$,
   b. from transforming the carboxylic acid group into ester and amide groups, and,
   c. from transforming both the p-oxo group into oxime and the carboxylic acid group into ester and amido groups; and,
2 the p-carboxy-phenoxy-alkyl-carboxylic acids, hereafter called "diacids" and derivatives thereof which result from the transformation of one or the both carboxylic acid groups into ester and amide groups.

Among the compounds of the "p-carbonyl" type, $R^{ri}$ represents H, $C_1-C_5$ alkyl, aryl preferably $C_6H_5$, $p-ClC_6H_4$ and $p-F-C_6H_4$.

Among the "diacid" type $R^{ri}$ represents OH, $C_1-C_6$ alkoxy, aryloxy preferably phenoxy and p-chlorophenoxy, cycloalkyloxy preferably cyclopentyloxy, cyclohexyloxy, $\Delta 1,2$ cyclohexenyloxy, $NR_3R_4$, $NHCH_2CH_2NR_3R_4$, or $O-alkylen-NR_3R_4$.

Methods for preparing compounds of the formula I are given below, these methods which concern the causes where B is $CR''R^r$ can also be used when B is $CHR'-A$.

The para-carbonyl compounds of formula I in which X' is an oxygen atom and Y' is a hydroxy group or a $C_{1-3}$ alkoxy group may be prepared by reacting a parahydroxybenzoyl compound of the formula

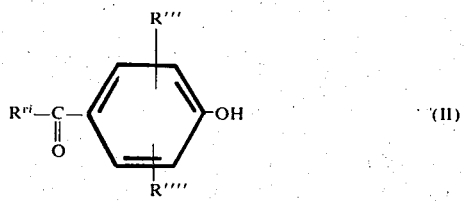

in which $R^{ri}$, $R'''$ and $R''''$ are defined as above with a halogen compound of the formula

in which Hal represents a halogen atom, $Y''$ is a hydroxy group or a $C_{1-3}$ alkoxy group and $R^r$ and $R''$ are as defined above, in an alkaline medium.

The carbonyl function C=O may be converted into an oxime function or an ester or other ester of an amide function respectively, using a method known per se for converting a carbonyl function to an oxime function or for converting a carboxylic or $C_{1-3}$ alkoxy ester function to an ester, other ester or amide function.

The following procedures may be used to prepare the compounds of formula I:

PROCEDURE A

Preparation of acids, esters and amides of formula I, in which $R''$ is a hydrogen atom X' is an oxygen atom a. A p-hydroxyphenyl derivative having the formula

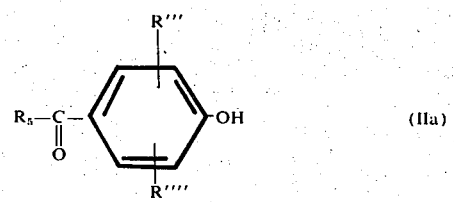

in which $R_5$ is a hydrogen atom or an alkyl or aryl group, particularly a p-chlorophenyl group, is reacted with an α-halogenated acid of the formula

or an α-halogenated ester of the formula

in order to obtain respectively a compound of the formula

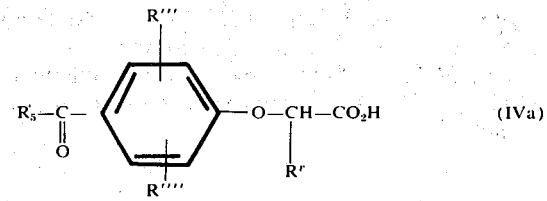

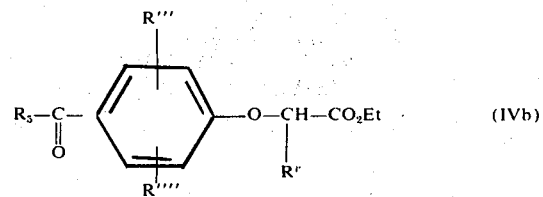

b. When $R_5$ represents a hydrogen atom of an alkyl group, compound IVa may be esterefied using methyl or ethyl alcohol; the ester obtained may be condensed with an appropriate amine to produce a desired amide of formula I, or transesterified to synthesize an ester of formula I, other than those already mentioned in procedures A (a) and a (b).

c. When $R_5$ represents an aryl radical, compound IVa may be converted by means of $SOCl_2$ or $PCl_5$ into the corresponding acid chloride which may be reacted with an appropriate amine, alcohol or amino alcohol, in accordance with a method known per se, in order to obtain respectively a desired amide, ester or amino ester of formula I.

d. Compound IVb may be condensed with an appropriate amine in accordance with a method known per se to produce a desired amide of formula I or compound IVb may be transesterified to prepare other esters of formula I.

PROCEDURE $A_1$

Preparation of acids, esters and amides of formula I in which $R^r = R'' = CH_3$ and $X' = O$ a. An acetone-chloroform mixture or an α-halogenated ester of the formula $Br-C(CH_3)_2-CO_2Et$ (V), is reacted with compound IIa in an alkaline medium, in order to obtain respectively a compound of the formula

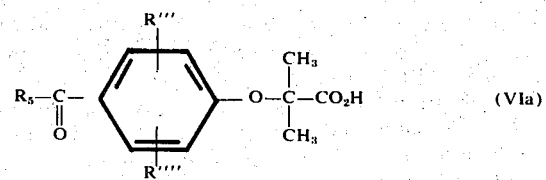

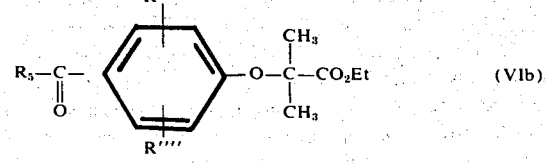

b. Compound VIa can be esterified by means of a lower alcohol, for instance to give methyl, ethyl or isopropyl ester, particularly when $R_5$ is an alkyl group.

c. Ester VIb can be amidified or transesterified, in accordance with methods known per se to produce respectively an amide or other ester of the formula I.

d. When $R_5$ is an aryl group, compound VIa may be converted into the corresponding acid chloride by means of $SOCl_2$ or $PCl_5$ and then, if desired, the acid chloride may be reacted with an appropriate amine, alcohol or amino-alcohol to produce an amide, ester or amino ester respectively of the formula I.

PROCEDURE B

Preparation of aldoximes and ketoximes of formula I, i.e. compound of formula I in which $X' = NOH$ or $NOR_0$.

a. The compounds of formula I in which $X' = NOH$ may be prepared by treating corresponding compounds of formula I in which $\chi' = O$ with hydroxylamine hydrochloride in a basic medium, preferably a pyridinic medium.

b. The compounds of the formula I in which $X' = NOR_0$ may be prepared
— by condensing corresponding compounds of formula I in which $X' = O$ in a basic (pyridine) medium, with a substituted hydroxylamine hydrochloride, such as:

$H_2N-O-R_0 \cdot HCl$

- from the compound of formula I, in which $X' = NOH$, by the following reactions:

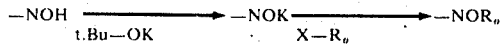

The following examples are given to illustrate the invention.

EXAMPLE 1

4-Acetyl-3-thiomethyl-phenoxyacetic acid

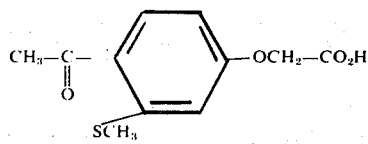

a. Preparation of 4-hydroxy- 2-thiomethyl-acetophenone

This step is effected in accordance with a "pseudo Fries" operation; m-thiomethyl-phenol and acetyl chloride are successively added at 0°C to a solution of $AlCl_3$ in nitrobenzene (or a suspension of $AlCl_3$ in ligroine or dichloroethylene); the resulting mixture is kept at 25° C for 17 hours, and hydrolyzed; 4-hydroxy-2-thiomethyl-acetophenone is then isolated by extraction using dilute sodium hydroxide and washing with hexane. Its melting point is 168°C.

b. 4-acetyl -3-thiomethyl-phenoxyacetic acid

A mixture of 1 mole of 4-hydroxy -2-thiomethyl acetophenone, 2.2 moles of NaOH, 1.2 mole of $ClCH_2-CO_2H$ and 1300 cc of water, is refluxed for 7 hours.

After acidification and extraction with $NaHCO_3$, followed by a second acidification, 4-acetyl-3-thiomethyl-phenoxyacetic acid is isolated. Its melting point is 245°C.

EXAMPLE 2

Ethyl p-isobutyryl-phenoxy-acetate

Ethyl bromoacetate is reacted with para-hydroxy-isobutyrophenone in anyhydrous acetone in the presence of anyhydrous $K_2CO_3$. The mixture is refluxed for 12 hours and then hydrolyzed. Acetone is then evaporated from the mixture under vacuum, and an ester is extracted with ether. Ethyl para-isobutyryl-phenoxyacetate, the melting point of which 40°C is obtained is a solid product. It formula is:

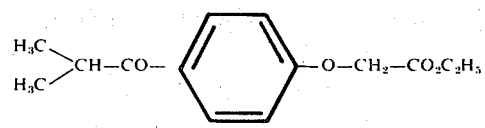

EXAMPLE 3

N-(p-Propionyl-phenoxyacetyl) -morpholine This example illustrates the procedures A (b) and A (d) described above.

a. Methyl p-propionyl-phenoxyacetate 1 mole of p-propionyl-phenoxyacetic acid is refluxed during 10 hours, with 100 cc of MeOH and 300 cc of $CHCl_3$ or $CH_2Cl_2$ in the presence of sulfuric acid. The resulting mixture is poured into water. The desired ester remains in the organic phase. It is washed once with dilute NaOH, then twice with water. Pure methyl p-propionyl-phenoxyacetate is thus isolated, with a yield of above 90%. MP : 59°C.

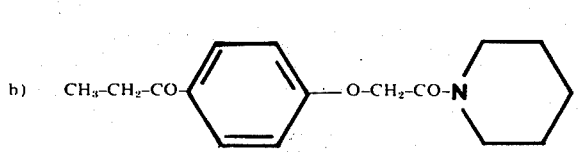

1 mole of the ester obtained in step (a) is refluxed for 8 hours with 2.5 moles of morpholine. Then, 1 volume of water is added, and the product is left to crystallize in the cold state. The morpholine amide is filtered off and recrystallized from alcohol (yield : 85%; melting point: 88°C).

EXAMPLE 4

N-(p-benzoylphenoxyacetyl)-piperidine This example illustrates A (c) described above

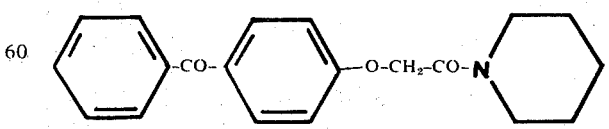

The piperidinoamide of p-benzoylphenoxy acetic acid is obtained by treating 1 mole of p-benzoylphenoxy acetic acid chloride with 2 moles of piperidine in benzene.

EXAMPLE 5

N-(p-[1-isonitrosopropyl]-phenoxyacetyl)-piperidine

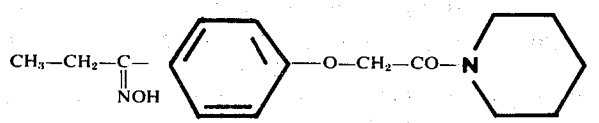

1 mole of 1-(p-propionylphenoxyacetyl)-piperidine is refluxed for 5 hours with 1.1 mole of $NH_2OH$, HCl and 1.05 mole of pyridine. The desired oxime is precipitated in water and recrystallized from alcohol. Its melting point is 144°C.

EXAMPLE 5 bis

Semi-industrial preparation of N- (p-1-nitrosoethyl-phenoxyacetyl)-piperidine

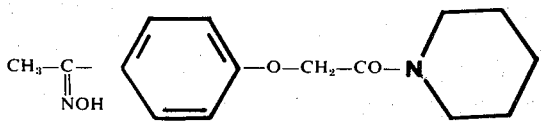

a. Preparation of p-acetylphenoxyacetic acid p-hydroxy-acetophenone is treated with chloroacetic acid in aqueous solution in the presence of sodium hydroxide. The desired acid is then isolated from its sodium salt in a total yield of 80–82%, excess of p-hydroxy-acetophenone having been extracted with methylene chloride.

b. Preparation of methyl p-acetylphenoxy-acetate

A mixture of 80 g of the acid obtained in step (a) and 200 ml of methyl alcohol in 600 ml of dichloromethane is refluxed in the presence of sulfuric acid. The desired ester is isolated in accordance with a method known per se, and recrystallized.

When the refluxing period is 12 hours the ester is obtained with a yield of 70%.

When the refluxing period is 18 hours, the yield for this ester is 85%.

c. Preparation of N-(p-acetyl-phenoxy-acetyl)-piperidine

The procedure described in example 3 is followed using thoroughly dried piperidine. The desired amide is obtained with a yield of 80%.

d. Preparation of N-(p-[1-isonitrosoethyl]-phenoxy-acetyl)-piperidine

The procedure described in example 5 is followed using technical hydroxylamine of 98% purity in place of 100% pure hydroxylamine, and alcohol adulterated with methanol in place of the absolute alcohol. The desired product is obtained in a yield of 75%.

In semi-industrial synthesis, to achieve better yields, it is possible to omit step (a), by directly preparing the ester (b) by reaction of p-hydroxy acetophenone on ethyl 2-bromoacetate in the presence of potassium carbonate in butanone. The yield of ester is 90%, and elimination of excess of p-hydroxyacetophenone is effected by washing with sodium hydroxide.

By using the procedure B (b) described above in place of step (d) corresponding oxime compounds in which $R_o$ is $CH_3$, $CH_2$—CHOH—$CH_2OH$, or $CH_2CH_2NR_3R_4$ where $NR_3R_4$ is $N(CH_3)_2$, $N(C_2H_5)_2$, pyrryl, pyrrolidyl, piperidyl, or morpholyl are prepared.

EXAMPLE 6

Preparation of para-(4-chlorobenzoyl)-phenoxy-isobutyric acid

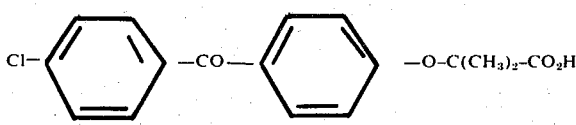

1 mole of 4-hydroxy-4'-chlorobenzophenone is dissolved in anhydrous acetone and then 5 moles of powered sodium hydroxide is added. The corresponding sodium phenoxide precipitates. Refluxing is effected, and then, 1.5 mole of $CHCl_3$ diluted with anyhydrous acetone is added and the resulting mixture is refluxed for 10 hours. After cooling, water is added, the acetone is evaporated, the aqueous phase is washed with ether and acidified and the organic phase is redissolved in ether and extracted into a solution of bicarbonate. The bicarbonate solution is then acidified to obtain the desired acid, having a melting point of 185°C, with a yield of 75%.

Esters and amides of the phenoxy-isobutyric acids prepared in accordance with the procedure of example 6 are produced in accordance with procedure $A_1$ described above.

EXAMPLE 7

Iso-propyl p-(4-chlorobenzoyl)-phenoxy-isobutyrate

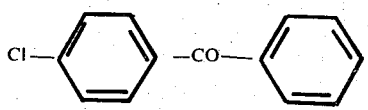

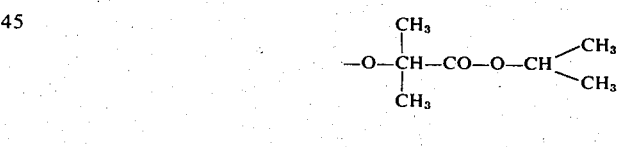

1 mole of the acid obtained in example 6 is converted into its acid chloride using thionyl chloride (2.5 moles). 1 mole of the acid chloride is then condensed with 1.05 mole of isopropyl alcohol in the presence of 0.98 mole of pyridine in an inert solvent such as benzene.

Since traces of $SO_2$ (which has a bad smell) may be obtained from the thionyl chloride, it is preferable to avoid this disadvantage by carrying out the esterification directly.

Using procedure B described above, isobutyric acids, and esters and amides thereof prepared in example 6 are connected to the corresponding oxime compounds.

By using the methods described above in examples 1–7 the following compounds were obtained.

N'-(4-chlorophenyl)-N-(p-acetylphenoxy-acetyl)-piperazine (melting point 115°C)

N-(p-acetylphenoxy-acetyl(-morpholine (melting point 112°C)

1-(p-acetylphenoxy-acetyl-4-methyl-piperidine (melting point 60°C)
N-(p-acetylphenoxy-acetyl)-azepine (melting point 18°C)
N-(p-acetylphenoxy-acetyl)-diethylamino-ethylamine (melting point 75°C)
N-(p-formylphenoxy-acetyl)-piperidine (melting point 96°C)
N-(p-acetylphenoxy-acetyl)-piperidine (melting point 97°C)
N-(p-isonitrosomethyl-phenoxy-acetyl)-morpholine (melting point 169°C)
p-[1-isonitrosoethyl]-phenoxy-acetic said.
ethyl p-[1-isonitrosoethyl]-phenoxy-acetate (melting point 103°C)
N-(p-[1-isonitrosoethyl]-phenoxy-acetyl)-piperidine (melting point 168°C)
N-(p-[1-isonitrosoethyl]-phenoxy-acetyl)-morpholine (melting point 145°C)
1-(p-[1-isonitrosoethyl]-phenoxy-acetyl)-4-methyl-piperidine (melting point 166°C)
1-(p-[1-isonitrosoethyl]-phenoxy-acetyl-4-(p-chlorophenyl)-piperidine (melting point 194°C)
N-(p-[1-isonitrosoethyl]-phenoxy-acetyl)-azepine (melting point 134°C)

The diacid of formula I in which $R^{ri}$ and $Y'$ are both hydroxy groups may be prepared in accordance with the invention by (a) reacting p-hydroxybenzoic acid which has the formula

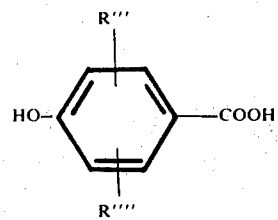

with a halogeno carboxylic acid having the formula

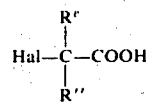

in which Hal represents a halogen atom in an aqueous alkaline medium under reflux, and (b) precipitating the resulting diacid in an acidic medium.

It is preferred to use one mole of p-hydroxy benzoic acid per mole of the halogeno carboxylic acid.

The compounds of formula I in which at least one of $R^{ri}$ and $Y'$ is other than hydroxyl can be prepared in accordance with the invention by converting at least one of the acid functions of the diacid into an ester or amide function by a method known per se for converting carboxylic acid groups to ester or amide groups.

The diacid, which has the formula

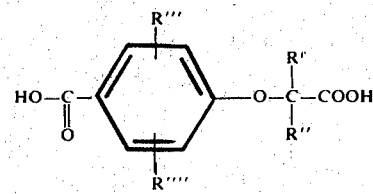

VII can be used directly:
a. for the synthesis of a diester of the invention in which $R^{ri} = Y'$ and $Y'$ is alkoxy,
b. to prepare an intermediate acid dichloride from which a diester or a diamide of the invention in which $R^{ri} = Y'$ can be synthesized, or
c. for the synthesis of a monoester of the invention; in this case the acid function carried by the oxyacetic chain, i.e. the group $OCR^rR''COOH$, is esterified through the acid monochloride prepared with $PCl_5$ in $C_6H_6$ at 0°C. The monoesters of the formula

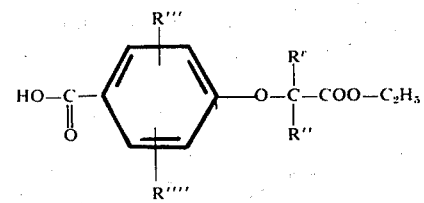

can be synthesized in accordance with method c) or else by the action of ethyl bromoacetate:

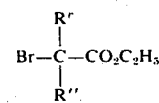

on a para-carboxyl-hydroxyphenone of the formula

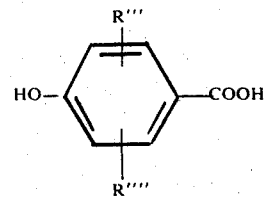

in a heterogenous alkaline medium.

From the monoesters of the invention, particularly those of formula VIII above, there can be obtained, by using a method known per se, monoamides of the invention, e.g. of the formula

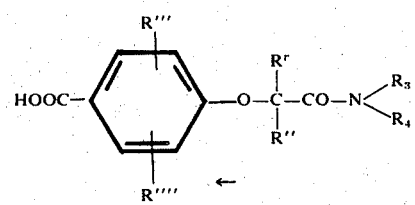  IX or acid monochlorides, e.g. of the formula

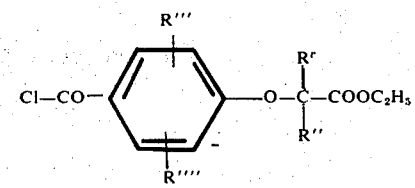  X

The acid monochlorides can in turn be converted into symmetrical and asymmetrical diesters and amide-esters of the invention, e.g. of the formula

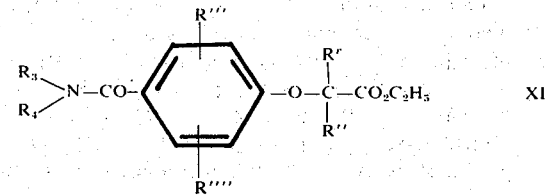 XI

Finally, a symmetrical or asymmetrical diester of the invention, e.g. of the formula

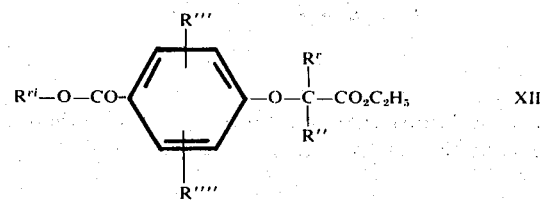 XII can be converted to an amide ester of the invention, e.g. of the formula

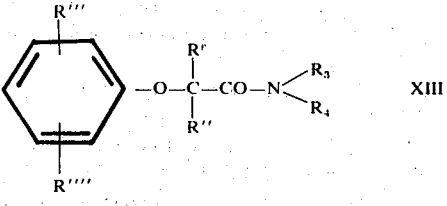 XIII

By a simple modification of the reaction sequences described above it is possible to obtain the compounds of the invention in which one of the $R^{ri}$–CO and -COY' group is an amino-ester group and the other of the $R^{ri}$-CO- and -COY is an amide group, any substituents on the nitrogen atom of the amino-ester group being identical to or different from those on the nitrogen atom of the amide group. This is illustrated in the following reaction scheme in which $>N_1$ and $>N_2$ represents non-identical amino groups.

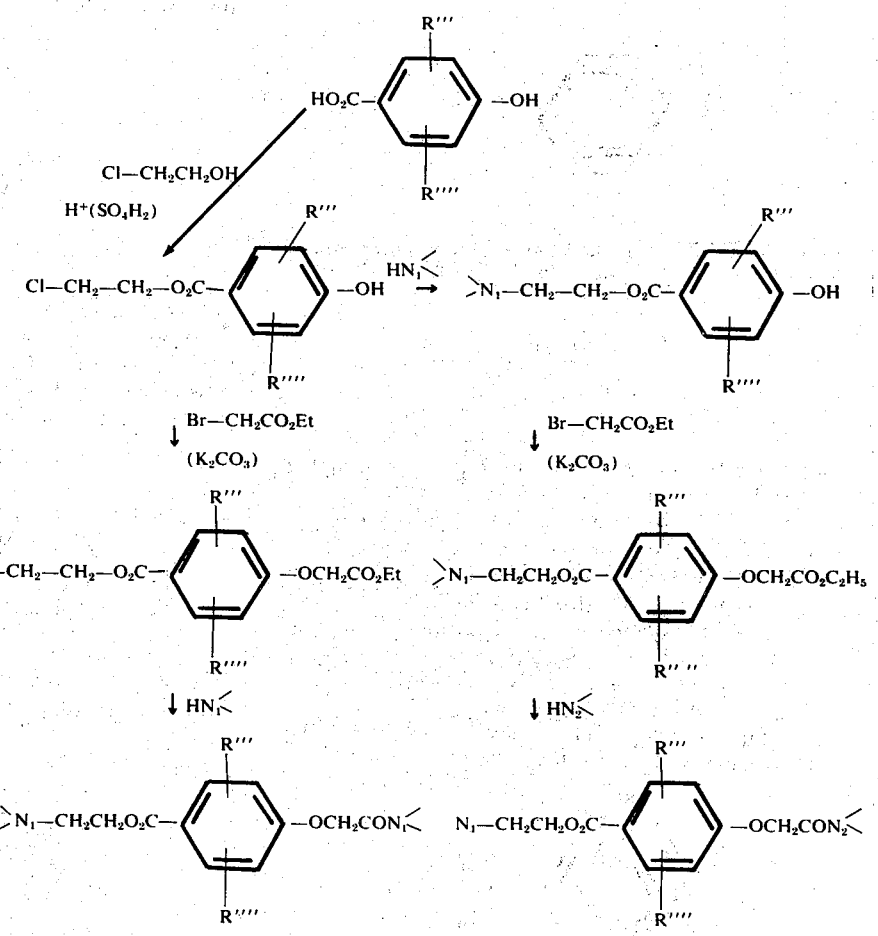

The following examples are given to illustrate the invention

EXAMPLE 9

N-(p-carboxyphenoxy-acetyl)-piperidine

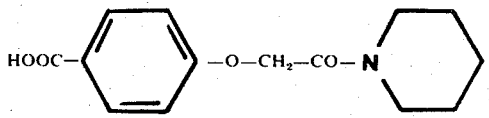

A mixture of 1 mole of ethyl p-carboxy-phenoxy-acetate and 2.5 moles of piperidine is refluxed for 7 hours. Water is then added, and 1-(p-carboxy-phenoxy-acetyl)-piperidine precipitates.

EXAMPLE 10

Ethyl para-piperidinocarbonyl-phenoxy-acetate

Operation is in accordance with the following reaction scheme:

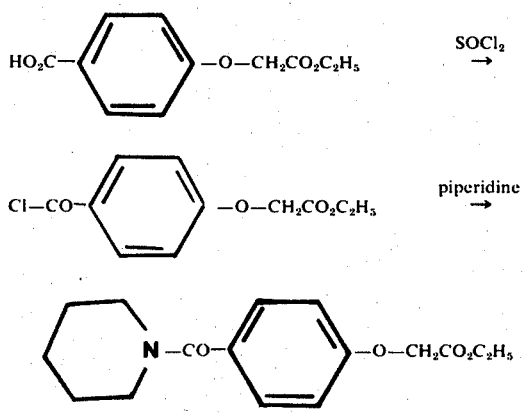

The amide ester product can be reacted with any amine, in accordance with the procedure described in Example 9, to produce a diamide.

The following examples illustrate particular procedures for preparing the compound No. 96 which has been found to possess anti-tussive and analgesic properties, and for compound 99.

EXAMPLE 11

N-(p-carboxyphenoxy-acetyl)-piperidine coded as No. 96 a. Ethyl p-carboxyphenoxy-acetate 1 mole of ethyl bromoacetate is reacted with 1 mole of p-hydroxy benzoic acid in the presence of 2 moles of $K_2CO_3$ in acetone, methyl-ethylketone, dioxan or tetra-hydrofuran, for 48 hours, at the reflux temperature of the organic solvent to obtain ethyl p-carboxy-phenoxy-acetate.

b. N-(p-carboxy-phenoxy-acetyl) piperidine

The preceeding ester (1 mole) is heated under reflux with piperidine (3 moles) in a chlorinated solvent, for 6 hours. Water is added to precipitate N-(p-carboxy-phenoxy-acetyl) piperidine after condensation is complete.

EXAMPLE 12

N-(p-ethoxycarbonyl-phenoxy-acetyl) piperidine coded as No 99

Ethyl p-carboxy-phenoxy-acetate is esterified in ethanol and chloroform in the presence of sulphuric acid. 1-(p-ethoxycarbonyl-phenoxy-acetyl)-piperidine is obtained by condensation of 1 mole of the resulting diester (ethyl p-ethoxycarbonylphenoxy-acetate) with 3 moles of piperidine in an inert solvent for 7 hours at the boiling temperature of said solvent.

According to the methods described above in examples 9–12 the following compounds were prepared.

p-carboxamido-phenoxy-acetic acid. (melting point 250°C)
ethyl p-carboxamido-phenoxy-acetate (melting point 143°C)
p-hydroxycarbonyl-phenoxy-acetic acid (melting point 282°C)
ethyl p-ethoxycarbonyl-phenoxy acetate (melting point 32°C)
N-(p-carboxyphenoxyacetyl)-morpholine (melting point 183°C)

What is claimed is:

1. A compound of the formula

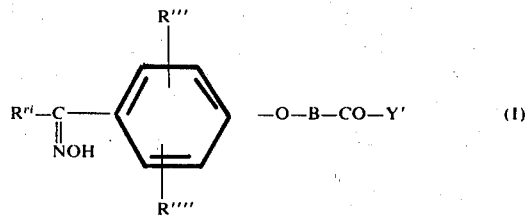

wherein

B is selected from the group consisting of CR''R''' and CHR'—A in which R' is H or $C_6H_5$, A is a $C_1$–$C_3$ alkyl group, R'' and R''' may be identical or different and represent H, $CH_3$, $C_2H_5$; R''' and R'''' may be identical or different and represent H, F, Cl or Br or a $C_1$–$C_5$ alkyl group;

$R^{ri}$ represents H or a $C_{1-5}$ alkyl group;

Y' represents $NR_3R_4$ or O–alkylene–$NR_3R_4$, wherein $R_3$ and $R_4$, may be identical or different and represent H, lower alkyl having from 1 to 5 carbon atoms, a $C_{3-7}$ cycloalkyl group or $R_3$ and $R_4$ considered together form with the nitrogen atom to which they are bound a member selected from group consisting of a 5- to 7- membered heterocyclic ring which may be interrupted with a second heteroatom selected from O, S and N and which may be substituted with a methyl group.

2. A compound according to claim 1 in which $NR_3R_4$ is amino, mono or dialkylamino, morpholino, thiamorpholino, pyrrolidino, piperidino, azepino, piperazino, N-p-chlorophenyl-piperazino, N-methylpiperazino, 4-methylpiperidino, anilino, 2,3-dimethyl anilino, p-chloroanilino, o-trifluoromethylanilino, p-trifluoromethylanilino, cyclohexylamino, cyclopentylamino, a N-methylanilino.

3. A phenoxy-alkyl carboxylic acid according to claim 1 in which Y' represents O–alkylene–$NR_3R_4$ wherein said alkylene group contains 1-6 carbon atoms.

4. A phenoxy-alkyl carboxylic acid according to claim 1 in which Y' is $NR_3R_4$.

5. A phenoxy-alkyl carboxylic compound according to claim 1 which is N-(p-[1-isonitrosopropyl]-phenoxyacetyl)-piperidine.

6. A phenoxy-alkyl carboxylic compound according to claim 1 which is N-(p-[1-isonitrosoethyl]-phenoxyacetyl-piperidine.

7. A phenoxy-alkyl carboxylic compound according to claim 1 which is N-(p[1-isonitrosoethyl]-phenoxyacetyl-morpholine.

* * * * *